United States Patent
Cao

(10) Patent No.: US 9,939,645 B2
(45) Date of Patent: Apr. 10, 2018

(54) ELECTRONIC GLASSES APPARATUS, CONTROL METHOD THEREOF AND DISPLAY SYSTEM

(71) Applicants: BOE Technology Group Co., Ltd., Beijing (CN); Beijing BOE Chatani Electronics Co., Ltd., Beijing (CN)

(72) Inventor: Sen Cao, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 103 days.

(21) Appl. No.: 14/802,124

(22) Filed: Jul. 17, 2015

(65) Prior Publication Data

US 2016/0195722 A1    Jul. 7, 2016

(30) Foreign Application Priority Data

Jan. 6, 2015 (CN) .......................... 2015 1 0005907

(51) Int. Cl.
*G02B 27/01* (2006.01)
*G09G 3/3208* (2016.01)
(Continued)

(52) U.S. Cl.
CPC ..... *G02B 27/0172* (2013.01); *G02B 27/0176* (2013.01); *G02B 27/286* (2013.01);
(Continued)

(58) Field of Classification Search
CPC .............. G02B 27/0176; G02B 27/286; G02B 27/0172; G06F 3/1423; G09G 3/3208
See application file for complete search history.

(56) References Cited

U.S. PATENT DOCUMENTS

2006/0181484 A1* 8/2006 Sprague .................. G02B 5/10
345/32
2012/0258296 A1* 10/2012 Nimura ................ G02B 5/3083
428/212
(Continued)

*Primary Examiner* — Abbas Abdulselam
(74) *Attorney, Agent, or Firm* — Westman, Champlin & Koehler, P.A.

(57) ABSTRACT

The invention relates to the field of displaying. The embodiments of the invention provide an electronic glasses apparatus, a control method thereof and a display system. In the case that a user is watching images displayed on a display apparatus through the electronic glasses apparatus, he/she would get a more excited and realistic experience when a dazzling image such as the Sun or explosion appears. The control method includes: receiving a synchronous video signal transmitted form a display apparatus which is apart from the electronic glasses apparatus by a preset distance; according to the synchronous video signal, acquiring parameters of a first area in a frame of an image displayed on the display apparatus when the display apparatus uses the synchronous video signal to display images, wherein the grey scale in the first area is greater than or equal to a preset grey scale; and according to the parameters of the first area, driving pixel cells of a second area in the electronic glasses apparatus to emit lights simultaneously, wherein the second area corresponds to the first area. The invention also discloses manufacturing of a display system which includes the electronic glasses apparatus.

20 Claims, 3 Drawing Sheets

(51) Int. Cl.
  *G02B 27/28* (2006.01)
  *G06F 3/14* (2006.01)
  *G09G 3/00* (2006.01)
  *G09G 3/20* (2006.01)
  *G09G 5/12* (2006.01)

(52) U.S. Cl.
  CPC ......... *G06F 3/1423* (2013.01); *G09G 3/3208* (2013.01); *G02B 2027/0112* (2013.01); *G02B 2027/0118* (2013.01); *G02B 2027/0154* (2013.01); *G02B 2027/0178* (2013.01); *G09G 3/003* (2013.01); *G09G 3/2077* (2013.01); *G09G 5/12* (2013.01); *G09G 2300/023* (2013.01); *G09G 2340/14* (2013.01); *G09G 2356/00* (2013.01)

(56) References Cited

U.S. PATENT DOCUMENTS

| | | | | |
|---|---|---|---|---|
| 2014/0354706 | A1* | 12/2014 | Yoon | H04N 13/0422 345/690 |
| 2015/0049133 | A1* | 2/2015 | Choi | G09G 3/3275 345/691 |
| 2015/0261492 | A1* | 9/2015 | Kawasaki | G06F 3/1423 345/2.1 |
| 2016/0274856 | A1* | 9/2016 | Liu | G06F 3/1431 |
| 2016/0283181 | A1* | 9/2016 | Jung | G06F 3/1446 |

* cited by examiner

ELECTRONIC GLASSES APPARATUS, CONTROL METHOD THEREOF AND DISPLAY SYSTEM

CROSS-REFERENCE TO RELATED APPLICATION

This Application is a non-provisional Application of Chinese Application No. CN 201510005907.1, filed Jan. 6, 2015, in Chinese, the contents of which are hereby incorporated by reference in their entirety.

TECHNICAL FIELD

The invention relates to the field of display, in particular, to an electronic glasses apparatus, a control method thereof and a display system.

BACKGROUND

With the continuous development of the display technology, not only a high quality image but also displaying with a more realistic experience is preferred for the user.

When a display apparatus in the prior art (such as Liquid Crystal Display (LCD), or Organic Light-Emitting Display (OLED)) is displaying pictures, the back light in the LCD or the OLED self-emitting light source may emit lights homogenously on respective areas of the screen. According to this, when a dazzling image such as the Sun or explosion appears on the displayed pictures, the brightness of the dazzling image may be the same as or similar to the brightness of other surrounding images, so it is hard for a user to acquire a more excited and realistic watching experience.

SUMMARY OF THE INVENTION

The embodiments of the invention provide an electronic glasses apparatus, a control method thereof and a display system. If a user watches an image displayed on a display apparatus through the electronic glasses apparatus, he/she could get a more excited and realistic image experience when the dazzling images such as the Sun or explosion are appeared.

In order to achieve the objects as mentioned above, the embodiments of the invention utilize the following solutions.

One embodiment of the invention provides a control method for an electronic glasses apparatus. The control method includes: receiving a synchronous video signal transmitted form a display apparatus which is apart from the electronic glasses apparatus by a preset distance; according to the synchronous video signal, acquiring parameters of a first area in a frame of an image which is displayed on the display apparatus when the display apparatus uses the synchronous video signal to display images, wherein the grey scale in the first area is greater than or equal to a preset grey scale; and according to the parameters of the first area, driving pixel cells of a second area in the electronic glasses apparatus to emit lights simultaneously, wherein the second area corresponds to the first area.

Preferably, the lights emitted by the pixel cells may be white lights; or the lights emitted by the pixel cells may have the same color with the lights emitted by the first area.

Preferably, the control method may further include: while the pixel cells of the second area in the electronic glasses apparatus are driven to emit lights simultaneously according to the parameters of the first area, controlling the pixel units of the remaining areas in the electronic glasses apparatus not to emit lights, wherein the second area corresponds to the first area.

Additionally, the embodiment of the present invention provides an electronic glass apparatus, which includes: a glasses frame, which includes a rim and legs, wherein an opening is provided on the rim; a signal receiver, which is disposed on the glasses frame and used to receive a synchronous video signal transmitted from a display apparatus which is apart from the electronic glasses apparatus by a preset distance; a OLED controlling circuit and a power supply disposed in the rim, wherein the OLED controlling circuit is used to acquire parameters of a first area in a frame of image displayed on the display apparatus according to the synchronous video signal while the display apparatus uses the synchronous video signal to display images, wherein the grey scale in the first area is greater than or equal to the preset grey scale, and the power supply is used to supply power to the OLED controlling circuit; a transparent OLED display sheet, disposed in the opening area of the frame, the OLED display sheet includes a plurality of pixel cells arranged in an array, and wherein pixel cells of a second area in the electronic glasses apparatus are driven to emit lights simultaneously by the OLED controlling circuit according the parameters of the first area, wherein the second area corresponds to the first area of the display apparatus.

Preferably, the pixel cells include a white light emitting unit; or the pixel cells at least include a red light sub-pixel cell, a green light sub-pixel cell and a blue tight sub-pixel cell. The lights emitted by the pixel cells have the same color with the light emitted by the first area.

Preferably, the OLED controlling circuit is further used to control the pixel cells of the remaining areas in the OLED display sheet not to emit lights, while the pixel cells of the second area corresponding to the first area are driven to emit lights simultaneously.

Preferably, the electronic glasses apparatus may further include a switch key disposed on the glasses frame, wherein the switch key is used to control turning on and turning off of the signal receiver and the OLED controlling circuit.

Based on the above description, the electronic glasses apparatus may preferably include a polarizer disposed at one side of the OLED display sheet which may approach to or depart from human eyes.

Additionally, the embodiment of the present invention may further provide a display system, which includes a display apparatus and an electronic glasses apparatus matched with each other for a synchronous video signal transmission, wherein the display apparatus includes a signal transmitter configured to transmit the synchronous video signal to the electronic glasses apparatus.

On the basis of it, the above electronic glass apparatus and control method thereof provided by the embodiment of the invention may receive the synchronous video signal S transmitted from a display apparatus which is apart from the electronic glasses apparatus by a preset distance d1; then according to the synchronous video signal S, when the display apparatus uses the synchronous video signal to display images, acquire parameters of a first area A1 in a frame of an image Fi which is displayed on the display apparatus, wherein the grey scale in the first area is greater than or equal to a preset grey scale; and subsequently, according to the parameters of the first area A1, drive pixel cells of a second area A2 in the electronic glasses apparatus to emit lights simultaneously, wherein the second area A2 corresponds to the first area A1. In this respect, when the display apparatus display the synchronous video signal S, since the pixel cells of the second area A2 correspond to the first area A1 which has a grey scale greater than or equal to the preset grey scale emit lights simultaneously, utilizing the weak light emitted by the pixel cells to stimulate human eyes may enhance the difference of the light intensity in the whole picture of the displayed image viewed by user through the electronic glasses apparatus, which enables the user to acquire a more excited and realistic watching experience.

BRIEF DESCRIPTION OF THE DRAWINGS

In order to illustrate the embodiments of the invention or the solutions in the prior art more clearly, the drawings used for describing the present embodiments or the prior art are discussed briefly in the following. It is apparent to those skilled in the art that the drawings in the following are merely some of the embodiments of the invention, and other drawings based on these drawings could be obtained without inventive efforts.

REFERENCE SIGNS

01—electronic glasses apparatus; 10—glasses frame; 11—rim; 11a—opening area; 12—leg; 20—signal receiver; 30—OLED controlling circuit; 40—power supply; 50—OLED display sheet; 51—pixel cell; 60—switch key; 02—display apparatus.

DETAILED DESCRIPTION

In the following description, the solutions in the embodiments of the invention would be described clearly and completely with combination to the drawings in the present invention. It is obvious that the described embodiments are only parts of the embodiments, rather than all the embodiments. Other embodiments without any other inventive effort from the described ones should be included in the scope of the present invention.

Figure 1:
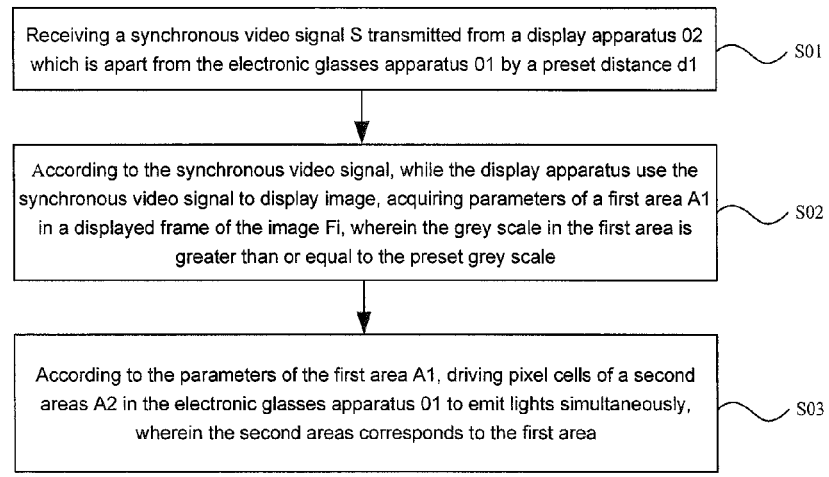
FIG. 1 is a flowchart diagram of control method of the electronic glasses apparatus according to one embodiment of the present invention.
Figure 2:
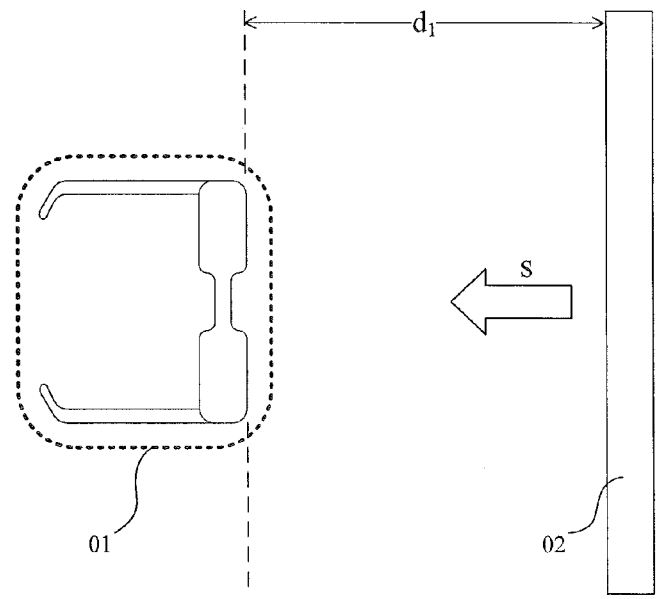
FIG. 2 is a schematic diagram of the step S01 in FIG. 1.
Figure 3:
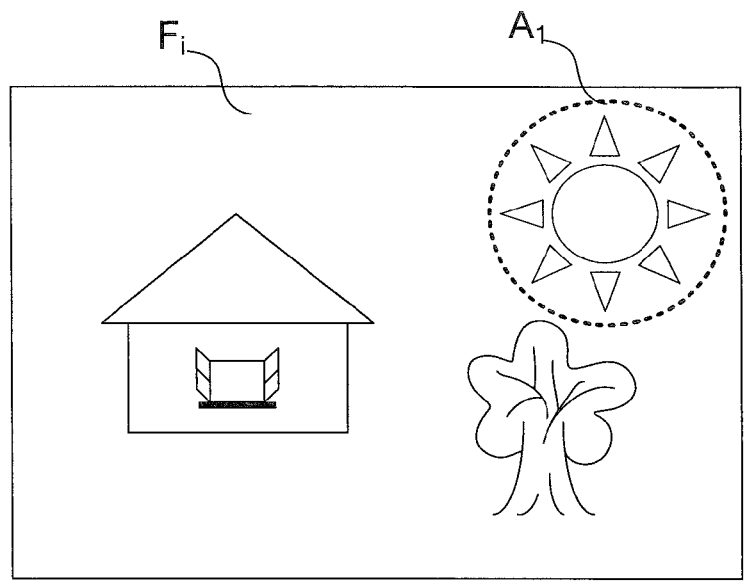
FIG. 3 is a schematic diagram of the step S02 in FIG. 1.
Figure 4:
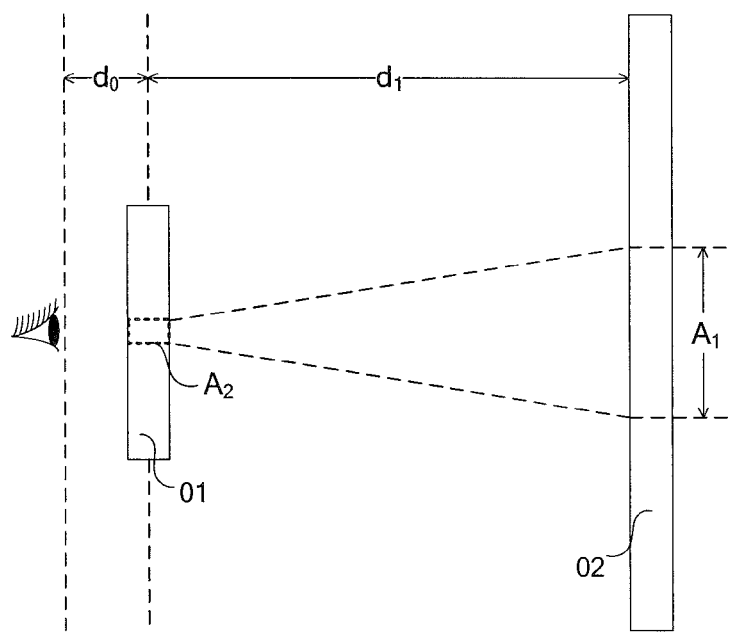
FIG. 4 is a schematic diagram of the step S03 in FIG. 1.

The embodiments of the invention provide a control method for an electronic glasses apparatus 01. As shown in FIG. 1, the control method includes steps of:

S01: as shown in FIG. 2, receiving a synchronous video signal (labeled as "S" in the drawings and hereinafter) transmitted from a display apparatus 02 which is apart from the electronic glasses apparatus 01 by a preset distance (labeled as "d1" in the drawings and hereinafter);

S02: as shown in FIG. 3, according to the synchronous video signal, while the display apparatus use the synchronous video signal to display image, acquiring parameters of a first area (labeled as "A1" in the drawing and hereinafter) in a displayed frame of the image (which is indicated by "Fi" in the drawing and hereinafter, wherein "i" represents any one of the frames in the synchronous video signal), wherein the grey scale in the first area is greater than or equal to the preset grey scale;

S03: as shown in FIG. 4, according to the parameters of the first area A1, driving pixel cells of a second areas (labeled as "A2" in the drawings and hereinafter) in the electronic glasses apparatus 01 to emit lights simultaneously, wherein the second areas corresponds to the first area.

It is noted here as follows:

Firstly, the synchronous video signal S refers to a signal which has a time reference as same as the video signal displayed on the display apparatus 02;

Secondly, in a displayed frame of the image, a greater grey scale may represent a brighter light emitted by the corresponding pixel cells, i.e. for example, corresponding to the image of the dazzling Sun in the first area A1. In step S02, the specific value of the preset grey scale could be adjusted flexibly according to the display structure parameter of the display apparatus 02 and the synchronous video signal, which is not specifically limited;

Finally, with reference to FIG. 4, when a user watches the images displayed on the display apparatus 02 through a single pixel cell in the electronic glasses apparatus 01, the area size of the image displayed by the display apparatus 02 which is overlaid by the single pixel cell is codetermined by a distance $d_0$ between the human eyes and the glasses lens of the electronic glasses apparatus 01 as well as a distance d1 between the glasses lens of the electronic glasses apparatus 01 and the screen of the display apparatus 02.

When the distance between the glasses lens of the electronic glasses apparatus 01 and the screen of the display apparatus 02 is too small, the area size of the image displayed by the display apparatus 02 which is overlaid by the single pixel cell in the electronic glasses apparatus 01 may be overlarge, which would overlay other areas besides the first area A1 when the pixel cells in the second area A2 illuminate, affecting the user watching the display effects of the image; and when the distance between the glasses lens of the electronic glasses apparatus 01 and the screen of the display apparatus 02 is overlarge, the area size of the image displayed by the display apparatus 02 which is overlaid by the single pixel cell in the electronic glasses apparatus 01 may be too small, which is hardly to overlay the whole first area A1 when the pixel cells in the second area A2 illuminate, affecting the user acquiring an excited and realistic experience when he/she is watching the displayed dazzling images, such as the Sun and explosion.

Thus, the preset distance d1 between the electronic glasses apparatus 01 and the display apparatus 02 should be provided. Since the preset distance d1 is related to the size of the visible area of the electronic glasses apparatus 01 (i.e. the so-called glasses lens area in the glasses and the screen area of the display apparatus 02), the specific value of the preset distance d1 is not limited, but is set according to the electronic glasses apparatuses 01 and the display apparatuses 02 of different types and sizes.

On basis of it, the previously discussed control method for the electronic apparatus 01 provided by the embodiment of the invention may receive the synchronous video signal S transmitted from a display apparatus 02 which is apart from the electronic glasses apparatus 01 by a preset distance d1; then according to the synchronous video signal S, when the display apparatus uses the synchronous video signal to display images, acquire parameters of a first area A1 (for example, an image area with the dazzling Sun as shown in FIG. 3) in a displayed frame of an image Fi, wherein the grey scale in the first area is greater than or equal to a preset grey scale; and subsequently, according to the parameters of the first area A1, drive pixel cells of a second area A2 in the electronic glasses apparatus 01 to emit lights simultaneously, wherein the second area A2 corresponds to the first area A1. In this respect, when the display apparatus 02 displays the synchronous video signal S, since the pixel cells of the second area A2 corresponding to the first area A1 which has a grey scale greater than or equal to the preset grey scale emit lights simultaneously, utilizing the weak lights emitted by the pixel cells to stimulate human eyes may enhance the difference of the light intensity in the whole picture of the displayed image viewed by user through the electronic glasses apparatus 01, for example, the intensity of the light in the area correspond to the dazzling Sun image shown in FIG. 3 is greater than the light of the surrounding images such as houses and trees, which enables the user to acquire a more excited and realistic watching experience.

In step S03, the lights emitted by the pixel cells of the second areas A2 which corresponds to the first area A1 may be white lights, namely, using white lights to stimulate human eyes for enabling the user to acquire a more excited and realistic watching experience.

Alternatively, the lights emitted by the pixel cells of the second areas A2 which corresponds to the first area A1 may have the same color with the lights emitted by the first area A1. For example, when the image correspond to the first area A1 is Sun, the lights emitted by the second area may be yellow, orange, red lights and the like with different tone scales (色阶), and therefore use the lights which have the same color with the lights emitted by the first area to stimulate human eyes, which also enables the user to acquire a more excited and realistic watching experience.

Based on the previous description, the control method may further include: while the pixel cells of the second area A2 in the electronic glasses apparatus 01 are driven to emit lights simultaneously according the parameters of the first area A1, controlling the pixel units of the remaining areas in the electronic glasses apparatus 01 not to emit lights, wherein the second area A2 corresponds to the first area A1. Accordingly, while the display apparatus 02 uses the synchronous video signal S to display images, there is no light stimulation in the areas in the displayed frame of the image other than the first area A1, enabling the large difference of the light intensity in the whole picture of the displayed image viewed by user through the electronic glasses apparatus 01 and further improving the realistic experience.

With reference to FIG. 1 to 4, the control method for the electronic glass apparatus provided by the embodiment of the present invention may be implemented by software, hardware, or the combination thereof, which is not limited herein.

Figure 5:
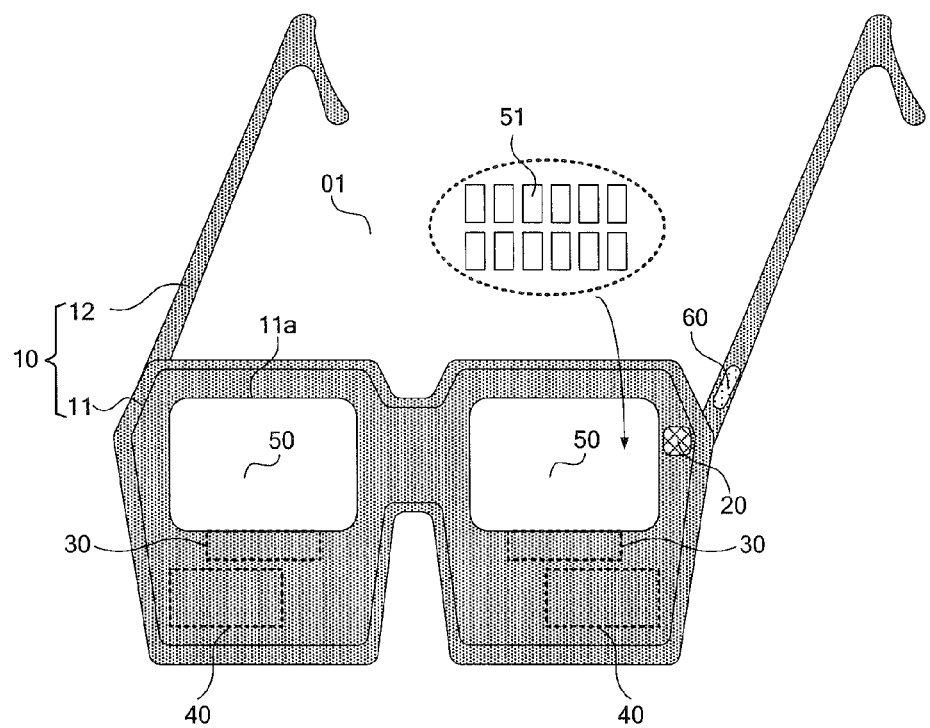
FIG. 5 is a schematic construction diagram of the electronic glasses apparatus according to the embodiments of the invention (wherein the enlarged diagram at the place indicated by the arrow is shown in the dashed box)

Based on the previous discussion, the embodiment of the invention may further provide an electronic glass apparatus 01 using the previous discussed control method. As shown in FIG. 5, the electronic glasses apparatus 01 may include: a glasses frame 10, which includes a rim 11 and legs 12, wherein an opening 11a is provided on the rim 11; a signal receiver 20, which is disposed on the glasses frame 10 and used to receive a synchronous video signal transmitted from a display apparatus which is apart from the electronic glasses apparatus 01 by a preset distance; a OLED controlling circuit 30 and a power supply 40 disposed in the rim 11, wherein the OLED controlling circuit 30 is used to acquire the parameters of a first area in a displayed frame of image according to the synchronous video signal while the display apparatus uses the synchronous video signal to display images, wherein the grey scale in the first area is greater than or equal to the preset grey scale; the power supply 40 is used to supply power to the OLED controlling circuit 30; a transparent OLED display sheet 50, disposed in the opening area 11a of the rim 11, the OLED display sheet 50 includes a plurality of pixel cells 51 arranged in an array; wherein, with reference to FIG. 4, a plurality of pixel cells 51 in a second area A2 are driven to emit lights simultaneously by the OLED controlling circuit 30 according the parameters of the first area A1, and wherein the second area A2 corresponds to the first area A1.

It is noted here as follows.

Firstly, in the above electronic glasses apparatus 01, the number of the legs 12 may be two as shown in FIG. 5, namely, the wearing mode of the electronic glasses apparatus is the same with the traditional optical glasses, which is worn by putting the two opposite legs 12 on the right and left ear roots respectively. Alternatively, the legs may also have an arc shape to surround the head of the user, namely, the wearing mode of the electronic glasses apparatus 01 may also be head mounted, which is not limited herein.

Secondly, in the above electronic glasses apparatus 01, the number of the transparent OLED display sheet 50 may be two as shown in FIG. 5, and it may also be a whole sheet structure, which is not limited herein.

Thirdly, the specific position of the signal receiver 20 on the glasses frame 10 may not be limited herein, as long as the signal receiver 20 could receive the synchronous video signal transmitted from the display apparatus. For example, the signal receiver may be provided outside of the rim 11, and may be built in the areas of the rim 11 other than the opening areas 11a. The user may not see the signal receiver 20 from the outside of the electronic glasses apparatus 01, making the structure of the electronic glasses apparatus 01 more concise.

Finally, in the above electronic apparatus 01, the power supply 40 may be battery and the like, for example.

Figure 6:
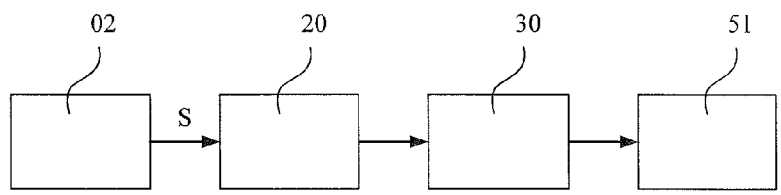
FIG. 6 is a schematic diagram for the control procedure of the electronic glasses apparatus illustrated in FIG. 5.

Based on the above description, as shown in FIG. 6, the previously discussed electronic glasses apparatus 01 provided by the embodiment of the invention may receive a synchronous video signal S transmitted from a display apparatus 02 which is apart from the electronic glasses apparatus 01 by a preset distance d1 via the signal receiver 20; then the OLED controlling circuit may acquire parameters of a first area A1 (for example, an image area with the dazzling Sun as shown in FIG. 3) in a displayed frame of an image Fi according to the synchronous video signal S, when the display apparatus uses the synchronous video signal to display images, wherein the grey scale in the first area is greater than or equal to a preset grey scale; and subsequently, according to the parameters of the first area A1, the OLED controlling circuit 30 may drive pixel cells of a second area A2 in OLED display sheet 50 to emit lights simultaneously, wherein the second area A2 corresponds to the first area A1. In this respect, when the display apparatus 02 displays the synchronous video signal S, since the pixel cells 51 of the second area A2 correspond to the first area A1 which has a grey scale greater than or equal to the preset grey scale emit lights simultaneously, utilizing the weak lights emitted by the pixel cells 51 to stimulate human eyes may enhance the difference of the light intensity in the whole picture of the displayed image viewed by user through the electronic glasses apparatus 01, for example, the intensity of the light in the area correspond to the dazzling Sun image shown in FIG. 3 is greater than the light of the surrounding images such as houses and trees, which enables the user to acquire a more excited and realistic watching experience.

Further, the pixel cells 51 may include a white light emitting unit; namely, the white lights emitted by the pixel cells 51 of the second area A2 correspond to the first area A1 is used to stimulate human eyes, enabling the user to acquire a more excited and realistic watching experience.

Alternatively, the pixel cells 51 may at least include a red light sub-pixel cell, a green light sub-pixel cell and a blue light sub-pixel cell. The lights emitted by the pixel cells have the same color with the light emitted by the first area, namely, the lights which have the same color with the lights emitted by the first area is used to stimulate human eyes, enabling the user to acquire a more excited and realistic watching experience.

Further, the OLED controlling circuit 30 is also used to control the remaining areas 51 of the pixel cells in the OLED display sheet 50 not to emit, while the pixel cells 51 of the second area A2 correspond to the first area A1 are driven to emit lights simultaneously. Accordingly, while the display apparatus 02 uses the synchronous video signal S to display images, there is no light stimulation in the areas in the displayed frame of the image Fi other than the first area A1, enabling the large difference of the light intensity in the whole picture of the displayed image viewed by user through the electronic glasses apparatus 01 and further improving the realistic experience.

Further, with reference to FIG. 5, the electronic glasses apparatus 01 may further include a switch key 60 disposed on the glasses frame, wherein the switch key 60 is used to control turning on and turning off of the signal receiver 20 and the OLED controlling circuit 30.

The switch key 60 can be provided at a position where it is convenient for the user to operate, for example, on the glasses legs 12. In this respect, since the OLED display sheet 50 is transparent, the user could control the turning on and turning off of the signal receiver 20 and the OLED controlling circuit 30 as desired, for achieving the enhancement of the excited and realistic experience whether or not.

Based on the above description, the electronic glasses apparatus 01 may further include a polarizer (not shown) disposed at one side of the OLED display sheet which may approach to or depart from human eyes. In the case that the image displayed by the display apparatus is a stereoscopic image which may include two set of pictures containing a vertically polarized light and a horizontally polarized light. The polarizer is used to direct the lights with different polarization directions into the right eye and the left eye correspondingly, which enables the user to watch the stereoscopic image with a more excited and realistic experience.

Based on the above description, the embodiment of the invention also provide a display system, which includes a display apparatus 02 and an previously discussed electronic glasses apparatus 01 matched with each other for a synchronous video signal transmission, wherein the display apparatus 02 may include a signal transmitter configured to transmit the synchronous video signal to the electronic glasses apparatus 01.

Herein, the above display apparatus 02 may be a liquid crystal display (LCD), such as a liquid crystal display, a liquid crystal television and a digital frame; and it may also be an organic light-emitting display (OLED), such as OLED panel, OLED display, OLED television or electronic paper and a product or member which has any display function.

It should be noted here that the drawings in the present invention are only schematic diagrams of the above electronic glasses apparatus 01 and control method thereof, which are only intended to illustrate the structures associated with the inventive concepts of the present invention clearly. The prior arts which are not associated with the inventive concepts of the present invention may be omitted or disclosed partially.

The above described embodiments are only several specific implementations of the present invention. However, the scope of the invention is not limited to this. It will be understood by those skilled in the art that various changes or alternatives may be made therein without departing from the spirit and scope of the disclosure as defined by the appended claims, and those changes or alternatives should be all included in the scope of the disclosure.

I claim:

1. A control method for an electronic glasses apparatus, comprising:
   receiving a synchronous video signal transmitted from a display apparatus which is apart from the electronic glasses apparatus by a preset distance, wherein the synchronous video signal refers to a signal which has a time reference as same as the video signal displayed on the display apparatus;
   according to the synchronous video signal, acquiring parameters of a first area in a frame of an image displayed on the display apparatus when the display apparatus uses the synchronous video signal to display the same images as those of the electronic glasses apparatus, wherein the grey scale in the first area is greater than or equal to a preset grey scale; and
   according to the parameters of the first area, driving pixel cells of a second area in the electronic glasses apparatus to emit lights simultaneously to represent a brighter light emitted by the corresponding pixel cells by a greater grey scale, wherein the second area corresponds to the first area.

2. The control method of claim 1, wherein
   the lights emitted by the pixel cells is white lights; or
   the lights emitted by the pixel cells have the same color with the lights emitted by the first area.

3. The control method of claim 2, further comprising:
   while the pixel cells of the second area in the electronic glasses apparatus are driven to emit lights simultaneously according to the parameters of the first area, controlling the pixel units of the remaining areas in the electronic glasses apparatus not to emit lights, wherein the second area corresponds to the first area.

4. The control method of claim 1, further comprising:
   while the pixel cells of the second area in the electronic glasses apparatus are driven to emit lights simultaneously according to the parameters of the first area, controlling the pixel units of the remaining areas in the electronic glasses apparatus not to emit lights, wherein the second area corresponds to the first area.

5. An electronic glasses apparatus, which includes:
   a glasses frame, which includes a rim and legs, wherein an opening is provided on the rim;
   a signal receiver, which is disposed on the glasses frame and used to receive a synchronous video signal transmitted from a display apparatus which is apart from the electronic glasses apparatus by a preset distance, wherein the synchronous video signal refers to a signal which has a time reference as same as the video signal displayed on the display apparatus;
   a OLED controlling circuit and a power supply, disposed in the frame, wherein the OLED controlling circuit is used to according to the synchronous video signal, acquire parameters of a first area in a frame of image displayed on the display apparatus while the display apparatus uses the synchronous video signal to display the same images as those of the electronic glasses apparatus, wherein the grey scale in the first area is greater than or equal to the preset grey scale, and the power supply is used to supply power to the OLED controlling circuit;

a transparent OLED display sheet, disposed in the opening area of the frame, the OLED display sheet includes a plurality of pixel cells arranged in an array, wherein pixel cells of a second area in the electronic glasses apparatus are driven to emit lights simultaneously to represent a brighter light emitted by the corresponding pixel cells by a greater grey scale by the OLED controlling circuit according the parameters of the first area, wherein the second area corresponds to the first area.

6. The electronic glasses apparatus of claim 5, wherein the pixel cells include a white light emitting unit; or the pixel cells at least include a red light sub-pixel cell, a green light sub-pixel cell and a blue light sub-pixel cell, and the lights emitted by the pixel cells have the same color with the light emitted by the first area.

7. The electronic glasses apparatus of claim 5, wherein the OLED controlling circuit is further used to control the remaining areas of the pixel cells not to emit lights, while the pixel cells of the second area corresponding to the first area are driven to emit lights simultaneously.

8. The electronic glasses apparatus of claim 7, wherein the electronic glasses apparatus further includes a polarizer disposed at one side of the OLED display sheet which approaches to or departs from human eyes.

9. The electronic glasses apparatus of claim 5, wherein the electronic glasses apparatus further includes a switch key disposed on the glasses frame, wherein the switch key is used to control turning on and turning off of the signal receiver and the OLED controlling circuit.

10. The electronic glasses apparatus of claim 9, wherein the electronic glasses apparatus further includes a polarizer disposed at one side of the OLED display sheet which approaches to or departs from human eyes.

11. The electronic glasses apparatus of claim 5, wherein the electronic glasses apparatus further includes a polarizer disposed at one side of the OLED display sheet which approaches to or departs from human eyes.

12. The electronic glasses apparatus of claim 6, wherein the electronic glasses apparatus further includes a polarizer disposed at one side of the OLED display sheet which approaches to or departs from human eyes.

13. A display system, wherein the display system includes a display apparatus and an electronic glasses apparatus according to claim 5 and matched with each other for a synchronous video signal transmission;

wherein the display apparatus includes a signal transmitter, which is used to transmit the synchronous video signal to the electronic glasses apparatus.

14. The display system of claim 13, wherein the pixel cells include a white light emitting unit; or the pixel cells at least include a red light sub-pixel cell, a green light sub-pixel cell and a blue light sub-pixel cell, and the lights emitted by the pixel cells have the same color with the light emitted by the first area.

15. The display system of claim 14, wherein the electronic glasses apparatus further includes a polarizer disposed at one side of the OLED display sheet which approaches to or departs from human eyes.

16. The display system of claim 13, wherein the OLED controlling circuit is further used to control the remaining areas of the pixel cells not to emit lights, while the pixel cells of the second area corresponding to the first area are driven to emit lights simultaneously.

17. The display system of claim 16, wherein the electronic glasses apparatus further includes a polarizer disposed at one side of the OLED display sheet which approaches to or departs from human eyes.

18. The display system of claim 13, wherein the electronic glasses apparatus further includes a switch key disposed on the glasses frame, wherein the switch key is used to control turning on and turning off of the signal receiver and the OLED controlling circuit.

19. The display system of claim 18, wherein the electronic glasses apparatus further includes a polarizer disposed at one side of the OLED display sheet which approaches to or departs from human eyes.

20. The display system of claim 13, wherein the electronic glasses apparatus further includes a polarizer disposed at one side of the OLED display sheet which approaches to or departs from human eyes.

* * * * *